United States Patent [19]
Schweizer

[11] Patent Number: 5,924,054
[45] Date of Patent: Jul. 13, 1999

[54] METHOD FOR CONTROLLING A MACHINE TOOL

[75] Inventor: Anton Schweizer, Wurmlingen, Germany

[73] Assignee: Chiron-Wrke GmbH & Co. KG, Tuttlingen, Germany

[21] Appl. No.: 08/832,805

[22] Filed: Apr. 4, 1997

[30] Foreign Application Priority Data

Apr. 20, 1996 [DE] Germany .......................... 196 15 816

[51] Int. Cl.$^6$ ................................ B23B 1/00; B23B 5/00
[52] U.S. Cl. ...................... 702/96; 702/105; 364/474.12; 364/474.15
[58] Field of Search .......................... 364/571.02, 571.01, 364/580, 474.01, 474.02, 474.06, 474.12, 474.15, 474.33, 474.35; 318/571, 569, 572; 82/1.11, 118, 121, 129; 702/96, 105

[56] References Cited

U.S. PATENT DOCUMENTS

| | | | |
|---|---|---|---|
| 3,644,049 | 2/1972 | Hahn et al. ................................ | 408/10 |
| 4,078,195 | 3/1978 | Mathias et al. .......................... | 318/561 |
| 4,115,956 | 9/1978 | Huffman .................................... | 51/96 |
| 4,131,837 | 12/1978 | Whetham ................................ | 318/571 |
| 4,214,309 | 7/1980 | Koide et al. ............................. | 364/474 |
| 4,382,215 | 5/1983 | Barlow et al. ........................... | 318/568 |
| 4,384,333 | 5/1983 | Maecker ................................... | 364/474 |
| 4,599,769 | 7/1986 | Latzko et al. ........................... | 29/26 A |
| 4,818,925 | 4/1989 | Lahm et al. .............................. | 318/567 |
| 4,873,793 | 10/1989 | Asano et al. ............................ | 51/165.71 |
| 4,881,021 | 11/1989 | Hirai ......................................... | 318/569 |
| 4,902,951 | 2/1990 | Ohta et al. ............................... | 318/632 |
| 4,990,840 | 2/1991 | Migda ....................................... | 318/571 |
| 5,285,378 | 2/1994 | Matsumoto .............................. | 364/157 |
| 5,400,260 | 3/1995 | Matsumura et al. ................... | 364/474.22 |
| 5,404,308 | 4/1995 | Kajiyama ................................. | 364/474.3 |
| 5,493,502 | 2/1996 | Niwa ........................................ | 364/474.3 |
| 5,532,932 | 7/1996 | Niwa ........................................ | 364/474.3 |

FOREIGN PATENT DOCUMENTS 2 207 623   2/1989   United Kingdom .

OTHER PUBLICATIONS

European Search from the European Patent Office, Nov. 20, 1998.

*Primary Examiner*—Patrick Assouad
*Attorney, Agent, or Firm*—Cummings & Lockwood

[57] ABSTRACT

A method is described for controlling a machine tool that has a spindle which rotates at a variable rotation speed n about a spindle axis. The spindle carries a facing head that is fitted with a tool whose radial distance V from the spindle axis is adjustable by means of a control system. The distance V and/or the rotation speed n are modified as a function of a machining operation to be performed with the tool. In order to attain a desired distance $V_{actual}$, the control system specifies a reference value $V_{ref}$ that is smaller than the desired distance $V_{actual}$ by a certain correction value $\Delta V$, the correction value $\Delta V$ being calculated as a function of the desired distance $V_{actual}$ and the rotation speed n.

13 Claims, 2 Drawing Sheets

METHOD FOR CONTROLLING A MACHINE TOOL

BACKGROUND OF THE INVENTION

1. Field of the Invention

The present invention relates to a method for controlling a machine tool that has a spindle, rotating at a variable rotation speed about a spindle axis, which carries a facing head that is fitted with a tool whose radial distance from the spindle axis is adjustable by means of a control system, the distance and/or the rotation speed being modified as a function of a machining operation to be performed with the tool.

2. Related Prior Art

Machine tools of this kind having facing heads are known from the related art.

"Facing heads" are understood to mean arrangements with which it is, for example, possible to face-turn large surfaces of workpieces. The particular feature of these facing heads is that a facing tool can be displaced radially with respect to the spindle axis, so that the turning diameter is variable. In the case of numerically controlled machine tools, a further numerical axis is obtained in this fashion.

The facing head is, in this context, joined immovably to the spindle so that it rotates along with the spindle. Depending on the machining operation to be performed, a different tool sits in the facing head and is driven at a specific spindle rotation speed, the radial distance of said tool from the spindle axis generally being changed during the machining operation so that the trajectory of the tool about the spindle axis changes accordingly.

Provided in the facing head for radial displacement of the tool are, for example, helical gear sets that are actuated through the spindle axis by means of a displacement motor different from the spindle drive system. In this context, the tool is as a rule received in a slide that is radially displaced via the helical gear set. A balance weight that is shifted in the correspondingly opposite direction is often provided in order to compensate for the resulting imbalance.

It has now been found that, because of the centrifugal forces present as well as other influences, the trajectory of the tool about the spindle axis deviates from the distance set by the control system, so that machining inaccuracies occur as a result.

In the related art, the dimensional deviations occurring in this fashion are compensated for by the fact that test pieces of the workpiece to be produced in production series with the machine tool are manufactured first, and the dimensional deviations are determined on them. The parameters set via the control system are then correspondingly corrected for the distances, whereupon a new test piece is machined. This procedure is performed iteratively until sufficient dimensional accuracy is achieved on the machined workpiece. The parameters obtained in this fashion are then used to produce the workpieces in production series.

A disadvantage of this method is that it is very time-consuming due to the iterative search for the correct parameters. A further disadvantage is the fact that this method must be performed afresh for each new workpiece geometry.

SUMMARY OF THE INVENTION

In view of the above, it is an object of the present invention to improve the method mentioned at the outset in such a way that the influences negatively affecting dimensional accuracy can be compensated for easily and rapidly.

According to the invention this object is achieved, in the case of the method mentioned at the outset, by the fact that in order to attain a desired distance, the control system specifies a reference value that is smaller than the desired distance by a certain correction value, the correction value being calculated as a function of the desired distance and the rotation speed.

The object of the invention is completely achieved in this fashion.

The inventor of this application has, specifically, recognized that it is possible to create a mathematical correlation between the correction value, the desired distance, and the current rotation speed, so that the control system itself can calculate, from the desired distance and the rotation speed to be set, the reference value by which the tool must be moved out away from the spindle axis.

It is preferred in this context if the correction value $\Delta V$ is calculated as a function of the square of the rotation speed n, the correction value preferably being calculated according to the following formula:

$$\Delta V = c \cdot n^2 \cdot V_{actual}$$

where c is a machine constant.

The inventor of this application has recognized that this linear relationship is sufficient to calculate a correction value that must then simply be subtracted from the desired distance $V_{actual}$ in order to arrive at the reference value that the control system must set. In particular, the linear dependence of the correction value $\alpha V$ on the square of the rotation speed of the spindle and thus of the facing head about the spindle axis yields a very good approximation that, for different spindle rotation speeds, leads to a very accurate setting of the desired distance $V_{actual}$.

This is because it has been recognized that the spindle rotation speed in particular has a strong influence on the resulting deviations from the reference value. Although the spindle of the machine tool and the facing head carried by it represent a mechanically very complicated system, this system can nevertheless be described in the simple manner shown above in terms of the deviations of the trajectory diameter. It has been discovered that all other machine tool parameters can be combined, for this purpose, in machine constant c; the machine constant c—as its name suggests—can be assumed to be constant, for the desired accuracy, for a given machine tool with a given facing head.

Initial experiments by the applicant have shown that by applying the method as so far described, the desired distances can be set to an accuracy greater than one tenth of a millimeter. It should be noted here that in the case of uncompensated machine tools, the deviations between the reference value and the resulting actual distance can be several tenths of a millimeter.

In an embodiment, it is preferred if the reference value is additionally reduced by a further constant correction factor which corresponds to the reversing backlash upon displacement of the tool.

The advantage here is that dimensional accuracy can be even further increased, since it has been found that the reversing backlash, i.e. the deviations which occur when the tool is adjusted from inside to outside or from outside to inside to a specific distance, is not perceptibly influenced by different rotation speeds or by the absolute magnitude of the reference value.

With this additional feature, the desired distance can now be set to within a few hundredths of a millimeter; in other words the new method makes it possible to work much more accurately with the machine tool known in the art than was possible previously.

It is further preferred in this context if the machine constant and/or the reversing backlash are determined once, before the machining operation with the tool begins, from a test measurement, the test measurement preferably being performed in a test series in which the required reference value is determined for different rotation speeds for various distances.

The advantage here is that a machine tool fitted with a specific facing head needs to be subjected only once to a test measurement, in which both the reversing backlash of the facing head and the machine constant c are determined. Once these values have been determined, they can be programmed into the control system of the machine tool, where they are then taken into account upon radial displacement of the tool, as described above. The control system retrieves, from the program for the particular tool being produced, the desired radial distance and the required spindle rotation speed, and calculates therefrom, using the machine constant c and in consideration of the reversing backlash, the reference value that it must pass on to the machine tool. This reference value is smaller than the desired distance by the correction factor $\Delta V$ and the reversing backlash $V_0$.

When another workpiece then needs to be machined, or must be worked on at a different speed, no new measurements need to be performed as they did with the related art. Instead, the required reference value is individually calculated from the values, determined once for the machine tool fitted with a facing head, for the machine constant c and reversing backlash $V_0$ for each desired radial distance. Since this calculation requires simple multiplications and subtractions, it can be performed very quickly, so that the control system can perform these calculations in real time.

A particular advantage of the new method as described so far is therefore that the laborious iterative "break-in" for each new workpiece, as known from the related art, can be dispensed with.

The inventor has further recognized that the new method is also applicable to machine tools in which the workpieces on the facing head are exchanged either manually or automatically. Specifically, the individual tools are precisely matched in terms of their weight to the particular facing head, so that in terms of the new compensation method described so far it is immaterial which tool is currently located in the facing head; it must simply be designed for that facing head.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is depicted in the appended drawings and will be explained in more detail in the description below. In the drawings.

DESCRIPTION OF THE PREFERRED EMBODIMENT

Figure 1:
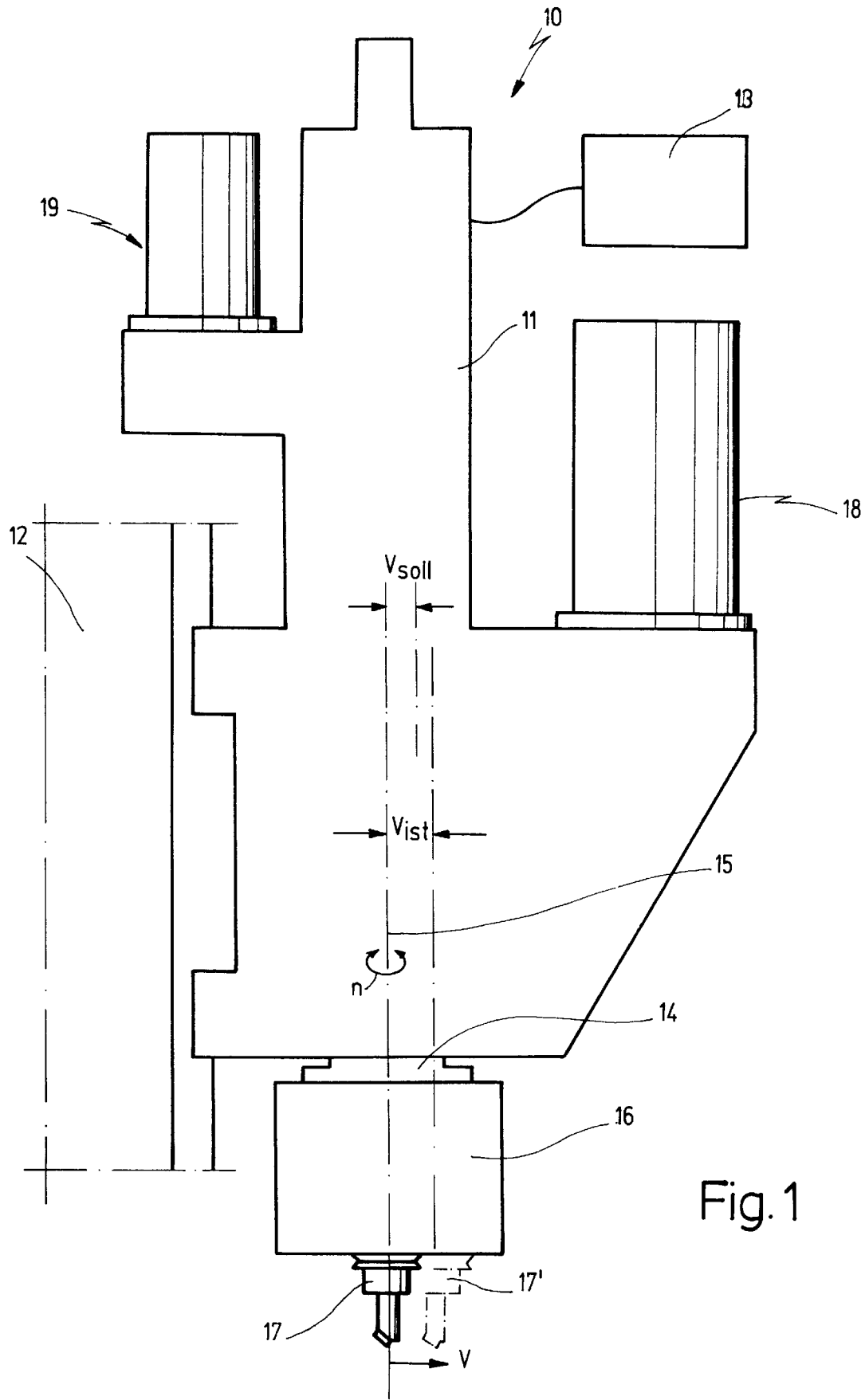
FIG. 1 shows, in a schematic partial side view, a machine tool fitted with a facing head.

In FIG. 1, 10 generally designates a partially shown machine tool which comprises a spindle head 11 that can be moved in known fashion on a machine frame 12. Machine tool 10 further comprises a schematically indicated control system 13 by means of which the individual procedures on machine tool 10 are controlled.

A spindle 14 is arranged in spindle head 11 rotatably about a spindle axis 15, such that spindle 14 can rotate about spindle axis 15 at variable rotation speeds n. Rotation speed n is specified by control system 13.

Spindle 14 carries at its lower end a facing head 16 known in the art, which is fitted with a tool 17 that, in the position shown in FIG. 1, is located in spindle axis 15. Shown at 17' is a tool that has been moved radially outward out of the spindle axis and is at a distance V from spindle axis 15.

FIG. 1 further shows a spindle motor 18 by means of which spindle 14 and thus facing head 16 are caused to rotate. Also evident is a displacement motor 19 by means of which tool 17 can be moved radially under the control of control system 13.

Because of the centrifugal forces which act on a tool 17' arranged outside spindle axis 15, the radius $V_{actual}$ (in the drawing $V_{ist}$) of the trajectory of tool 17' about spindle axis 15 is greater than the value $V_{ref}$ (in the drawing $V_{soll}$) set by control system 13.

Machine tool 10 described in FIG. 1 is now controlled so that for a desired distance $V_{actual}$ a correspondingly smaller distance $V_{ref}$ is specified, $V_{ref}$ being calculated, as a function of $V_{actual}$ and rotation speed n, as follows:

$$V_{ref}=V_{actual}-\Delta V-V_0$$

where $V_{actual}$=Desired radial distance; actual value $V_{ref}$=Distance to be specified; control system reference value $\Delta V$=Correction value $V_0$=Reversing backlash.

The following correlation applies to correction value $\Delta V$:

$$\Delta V=c \cdot n^2 \cdot V_{actual}$$

where c=Machine constant n=Rotation speed of spindle 14.

Reversing backlash $V_0$ is the deviation which results when a desired distance is set on the one hand radially from inside to outside, and on the other hand radially from outside to inside.

The inventor of this application has recognized that for a given machine tool fitted with a given facing head, machine constant c and reversing backlash $V_0$ can be assumed, in the context of the desired accuracies, to be constant, so that based on the above formulas the control system reference value for a given desired distance $V_{actual}$ can be calculated as follows:

$$V_{ref}=V_{actual}(1-cn^2)-V_0$$

Figure 2:
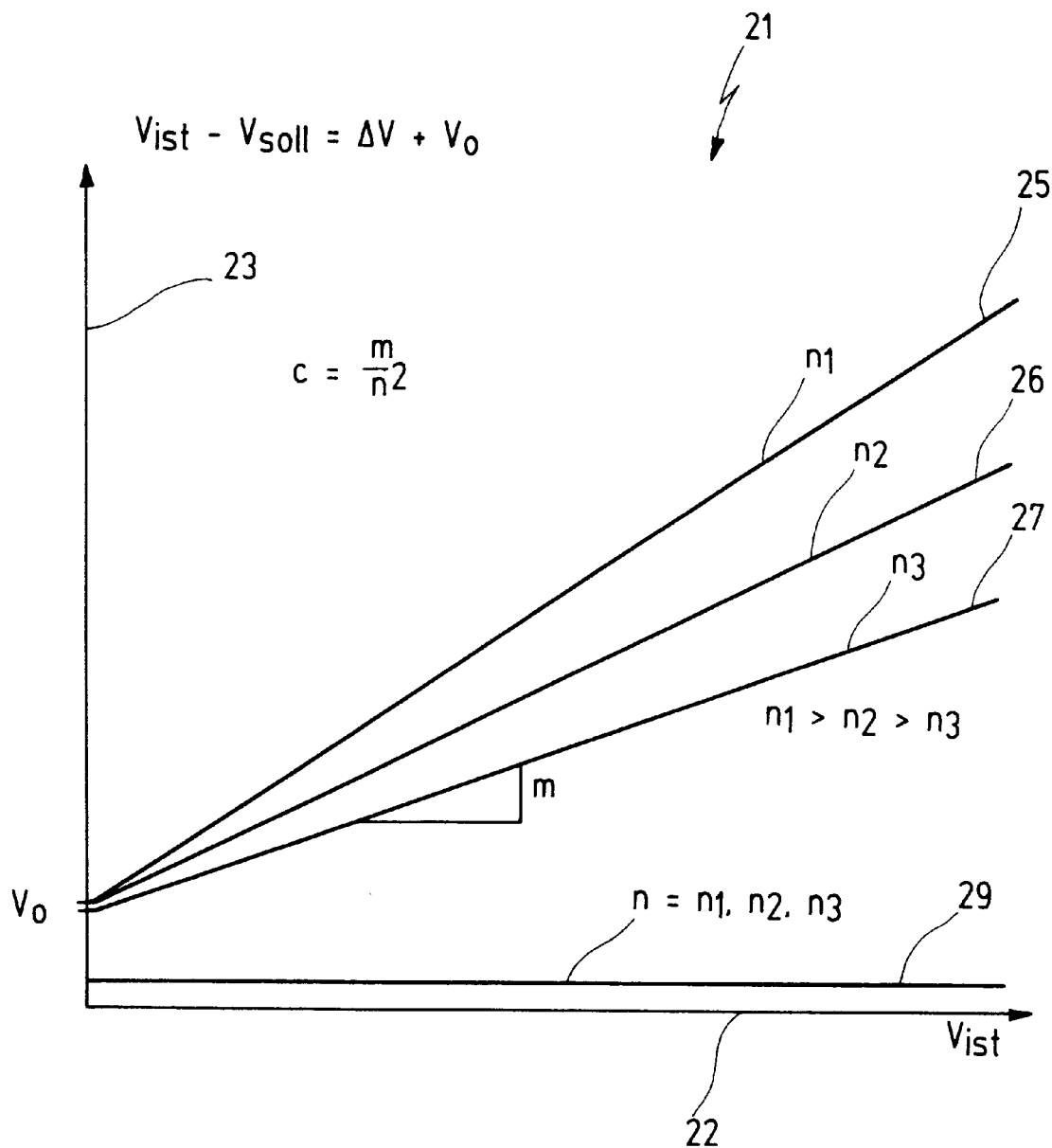
FIG. 2 shows a diagram that shows, for various rotation speeds in an uncompensated method, the deviations between the resulting distance $V_{actual}$ and the specified distance $V_{ref}$, this correlation also being shown for a compensated method.

FIG. 2 shows a diagram 21 that shows on its independent axis 22 the actual resulting values $V_{actual}$, and on its dependent axis 23 the difference between the actual value $V_{actual}$ and the specified reference value $V_{ref}$.

For an uncompensated method, various rotation speeds n1>n2>n3 result in curves 25, 26, 27, which show that the deviation increases as the rotation speed and/or the distance increase. All three curves 25, 26, 27 intersect axis 23 at approximately the same value, which corresponds to reversing backlash $V_0$.

Machine constant c can be calculated from the slopes m of curves 25, 26, 27 as follows:

$$c = m/n^2$$

Machine constant c and reversing backlash $V_0$ are now used, as described above, to correct reference value $V_{ref}$ accordingly; the result, for all rotation speeds n1, n2, and n3, is the curve shown at 29, which was determined on a machine tool operated with the new compensating method.

The parameters c and $V_0$ must be determined only once prior to startup of a new machine tool or of a machine tool with a new facing head; c and $V_0$ essentially do not change for different rotation speeds, tools, or radial distances.

The test measurement required to determine machine constant c and reversing backlash $V_0$ is generally performed in a measurement series in which the difference between $V_{actual}$ and $V_{ref}$ is plotted for various rotation speeds n, as represented by curves 25, 26, 27. In fact it would be sufficient to use only one of curves 25, 26, 27 to determine machine constant c and reversing backlash $V_0$, but because of unavoidable measurement inaccuracies it is advantageous if a number of such curves are plotted so that machine constant c and reversing backlash $V_0$ can be determined with greater statistical accuracy.

$V_0$ and slope m can, for example, be determined by performing a regression analysis on the underlying measurement points of curves 25, 26, 27, which yields the two desired values. Using the known rotation speed, all that is then necessary is to calculate machine constant c using the last formula indicated above.

Diagram 21 of FIG. 2 shows that curve 29, plotted with the compensated method, lies well below curves 25, 26, 27 and runs substantially parallel to axis 22. While the deviations in the case of curves 25, 26, 27 were in the range of several tenths of a millimeter, said deviations in the case of curve 29 are only approx. 0.03 mm, the reversing backlash having been determined in one example as 0.07 mm.

What I claim, is:

1. A method for controlling a machine tool that has a spindle, rotating at a variable rotation speed n about a spindle axis, which carries a facing head that is fitted with a tool whose radial distance V from the spindle axis is adjustable by means of a control system, the distance V and/or the rotation speed n being modified as a function of a machining operation to be performed with the tool, wherein in order to attain a desired distance $V_{actual}$, the control system specifies a reference value $V_{ref}$ that is smaller than the desired distance $V_{actual}$ by a certain correction value $\Delta V$, the correction value $\Delta V$ being calculated as a function of the desired distance $V_{actual}$ and the square of the rotation speed n.

2. The method of claim 1, wherein the correction value $\Delta V$ is calculated according to the following formula:

$$\Delta V = c \cdot n^2 \cdot V_{actual}$$

where c is a machine constant.

3. The method of claim 1, wherein the reference value $V_{ref}$ is additionally reduced by a further constant correction factor $V_0$ which corresponds to the reversing backlash upon displacement of the tool.

4. The method of claim 3, wherein the machine constant c and/or the reversing backlash $V_0$ are determined once, before the machining operation with the tool begins, from a test measurement.

5. The method of claim 4, wherein the test measurement is performed in a test series in which the required reference value $V_{ref}$ is determined for different rotation speeds n for various distances $V_{actual}$.

6. A method for controlling a machine tool that has a spindle, rotating at a variable rotation speed n about a spindle axis, which carries a facing head that is fitted with a tool whose radial distance V from the spindle axis is adjustable by means of a control system, the distance V and/or the rotation speed n being modified as a function of a machining operation to be performed with the tool, wherein in order to attain a desired distance $V_{actual}$, the control system specifies a reference value $V_{ref}$ that is smaller than the desired distance $V_{actual}$ by a certain correction value $\Delta V$, the correction value $\Delta V$ being calculated as a function of the desired distance $V_{actual}$ and the rotation speed n, wherein the reference value $V_{ref}$ is additionally reduced by a further constant correction factor $V_0$ which corresponds to the reversing backlash upon displacement of the tool, wherein the machine constant c and/or the reversing backlash $V_0$ are determined once, before the machining operation with the tool begins from a test measurement.

7. The method of claim 6, wherein the correction value $\Delta V$ is calculated as a function of the square of the rotation speed n.

8. The method of claim 7, wherein the correction value $\Delta V$ is calculated according to the following formula:

$$\Delta V = c \cdot n^2 \cdot V_{actual}$$

where c is a machine constant.

9. The method of claim 7, wherein the test measurement is performed in a test series in which the required reference value $V_{ref}$ is determined for different rotation speeds n for various distances $V_{actual}$.

10. A method for controlling a machine tool that has a spindle, rotating at a variable rotation speed n about a spindle axis, which carries a facing head that is fitted with a tool whose radial distance V from the spindle axis is adjustable by means of a control system, the distance V and/or the rotation speed n being modified as a function of a machining operation to be performed with the tool, wherein in order to attain a desired distance $V_{actual}$, the control system specifies a reference value $V_{ref}$ that is smaller than the desired distance $V_{actual}$ by a certain correction value $\Delta V$, the correction value $\Delta V$ being calculated as a function of the desired distance $V_{actual}$ and the square of the rotation speed n, wherein the reference value $V_{ref}$ is additionally reduced by a further constant correction factor $V_0$ which corresponds to the reversing backlash upon displacement of the tool.

11. The method of claim 10, wherein the correction value $\Delta V$ is calculated according to the following formula:

$$\Delta V = c \cdot n^2 \cdot V_{actual}$$

where c is a machine constant.

12. The method of claim 11, wherein the machine constant c and/or the reversing backlash $V_0$ are determined once, before the machining operation with the tool begins, from a test measurement.

13. The method of claim 12, wherein the test measurement is performed in a test series in which the required reference value $V_{ref}$ is determined for different rotation speeds n for various distances $V_{actual}$.

* * * * *

UNITED STATES PATENT AND TRADEMARK OFFICE
CERTIFICATE OF CORRECTION

PATENT NO. : 5,924,054
DATED : July 13, 1999
INVENTOR(S) : Anton SCHWEIZER

It is certified that error appears in the above-identified patent and that said Letters Patent is hereby corrected as shown below:

On the title page item [73], should read

-- Chiron-Werke GmbH & Co. KG --.

Signed and Sealed this

Seventh Day of December, 1999

Attest:

Q. TODD DICKINSON

Attesting Officer     *Acting Commissioner of Patents and Trademarks*